(12) United States Patent
Maisonneuve et al.

(10) Patent No.: US 10,489,607 B2
(45) Date of Patent: Nov. 26, 2019

(54) APPARATUS AND METHOD FOR A DOCUMENT MANAGEMENT INFORMATION SYSTEM

(71) Applicant: Innovative Lending Solutions, LLC, Frankfort, IL (US)

(72) Inventors: Edward A. Maisonneuve, Danforth, IL (US); Rebecca S. Brown, Frankfort, IL (US)

(*) Notice: Subject to any disclaimer, the term of this patent is extended or adjusted under 35 U.S.C. 154(b) by 258 days.

(21) Appl. No.: 15/582,118

(22) Filed: Apr. 28, 2017

(65) Prior Publication Data

US 2018/0314849 A1 Nov. 1, 2018

(51) Int. Cl.

| G06F 21/00 | (2013.01) |
|---|---|
| G06F 21/62 | (2013.01) |
| H04N 7/18 | (2006.01) |
| G06F 21/60 | (2013.01) |
| H04N 5/232 | (2006.01) |
| H04L 29/08 | (2006.01) |

(52) U.S. Cl.
CPC ........ G06F 21/6245 (2013.01); G06F 21/606 (2013.01); G06F 21/6209 (2013.01); H04N 5/232 (2013.01); H04N 7/183 (2013.01); G06F 2221/2143 (2013.01); H04L 67/02 (2013.01); H04L 67/18 (2013.01); H04L 67/306 (2013.01); H04M 2250/52 (2013.01)

(58) Field of Classification Search
CPC ............. G06F 21/6245; G06F 3/04817; G06F 3/04842
USPC ..................................................... 726/26–30
See application file for complete search history.

(56) References Cited

U.S. PATENT DOCUMENTS

| 9,983,569 B2* | 5/2018 | Carriere, IV ...... G05B 19/4099 |
| 2006/0242418 A1* | 10/2006 | Willamowski ........ G06T 1/0071 713/176 |
| 2007/0094296 A1 | 4/2007 | Peters, III |
| 2008/0040259 A1 | 2/2008 | Snow et al. |
| 2011/0313911 A1 | 12/2011 | Marcus |
| 2013/0211916 A1 | 8/2013 | Putnam |
| 2014/0101540 A1* | 4/2014 | King ....................... G06F 17/24 715/255 |
| 2014/0289099 A1 | 9/2014 | Meyer et al. |
| 2015/0112853 A1 | 4/2015 | Hegarty et al. |

FOREIGN PATENT DOCUMENTS

EP 0840244 A1 5/1998

* cited by examiner

*Primary Examiner* — Anthony D Brown
(74) *Attorney, Agent, or Firm* — Cygan Law Offices P.C.; Joseph T. Cygan

(57) ABSTRACT

A smartphone receives a notification from a first server over an Internet Protocol connection including a document description and displays the notification on the smartphone display. The camera is initiated by the processor, automatically in response to an acknowledgement of the notification and a document image is captured for a document matching the document description. The image is sent to the first server in response to the notification, without storing the image on the smartphone. The image is displayed on a remote computing device display without storing the image on the computing device. Upon receiving an image acknowledgement at the server, from the computing device; the image is sent to a second server from the first server over an IP connection.

20 Claims, 6 Drawing Sheets

APPARATUS AND METHOD FOR A DOCUMENT MANAGEMENT INFORMATION SYSTEM

FIELD OF THE DISCLOSURE

The present disclosure relates generally to document management information systems and more particularly to document management information systems that handle sensitive electronic documents and data obtained from various sources using network connectivity.

BACKGROUND

Document Management Information Systems, sometimes referred to as "DMS," involve handling of confidential electronic documents and data and face data security issues as well as data legal compliance issues related to privacy or other compliance requirements. Such data security compliance requirements may specify, among other requirements, how handling and storage is to be performed for confidential electronic documents and data. Storage of like confidential electronic documents and data at several points in a document management system process increase the risks associated with possible unauthorized access as well as potential storage violations that may be detected during audits.

DETAILED DESCRIPTION

Figure 1:
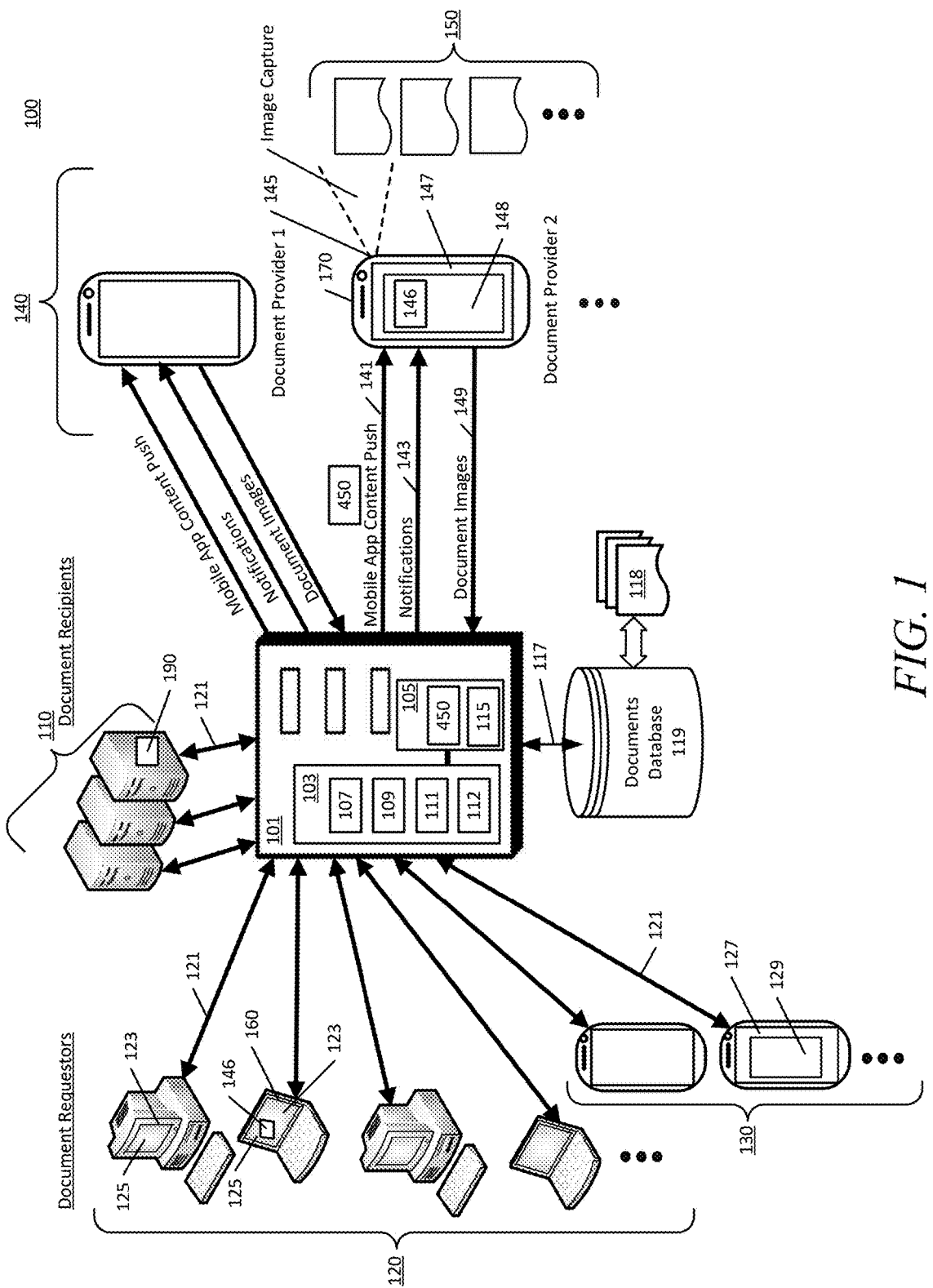
FIG. 1 is a diagram of a document management information system, in accordance with various embodiments.

Briefly, the present disclosure provides a method of operation that includes receiving a notification by a smartphone from a first server over an Internet Protocol connection. The smartphone includes a processor, a radio, a camera, a user interface and a display. The notification includes at least one document description and is displayed on the smartphone display. The camera is initiated by the processor, automatically in response to an acknowledgement of the notification, such that an image of a document matching the document description may be captured using the camera. The image is sent to the first server in response to the notification, without storing the image on the smartphone, and is displayed on a remote computing device display without storing the image on the computing device. The computing device is operatively coupled to the first server via an IP connection. When the first server receives an image acknowledgement from the computing device, it sends the image to a second server over an IP connection.

In some embodiments, the method of operation may further include automatically deleting the image from the first server, in response to an acceptance message accepting the image by the computing device. In some embodiments, the method of operation may further include receiving the image acknowledgement at the first server from the computing device, where the image acknowledgement includes an acceptance message. In some embodiments, the method of operation may further include determining by the first server that a required document is not present on the first server, and sending the notification to the smartphone including the document description for the required document. In some embodiments, the method of operation may further include receiving the image at the first server, displaying the image on a second display operatively coupled to the first server, receiving a second user input at the first server verifying the image, and sending the image to a second server over an IP connection and automatically deleting the image from the first server, in response to the user input verifying the image.

The present disclosure also provides a system with a smartphone, having camera equipment; a display; memory; and a processor operatively coupled to the camera equipment, to the display and to the memory. The smartphone processor is operative to: receive a notification including a document description from a first server over an Internet Protocol connection; display the notification on the display; initiate the camera equipment, automatically in response to an acknowledgement of the notification; capture an image of a document matching the document description using the camera; and send the image to the first server in response to the notification, without storing the image in the memory. The disclosed system also includes a computing device which has a computing device display; computing device memory; and a computing device processor operatively coupled to the display and to the memory. The computing device processor is operative to: display the image on the computing device display without storing the image in the computing device memory where the computing device is operative to be coupled to the server via an IP connection; and send an image acknowledgement to the server. The system also includes the first server which has first server memory, and a first server processor operatively coupled to the first server memory. The first server processor is operative to: receive the image acknowledgement from the computing device; and send the image to a second server over an IP connection.

In some embodiments, the first server processor is further operative to: automatically delete the image from the first server memory, in response to an acceptance message accepting the image by the computing device. In some embodiments, the first server processor is further operative to: receive the image acknowledgement from the computing device, where the image acknowledgement comprises an acceptance message. In some embodiments, the first server processor is further operative to: determine that a required document is not present in either of the first server memory or a database; and send the notification to the smartphone comprising the document description for the required document. In some embodiments, the first server processor is further operative to: receive the image; display the image on a second display operatively coupled to the first server; receive a second image acknowledgement; and send the image to a second server over an IP connection and automatically delete the image from the first server memory, in response to the image acknowledgement.

The present disclosure also provides another system which includes a first server, having a processor and memory operatively coupled to the processor. The processor is operative to: receive a plurality of unique document files and assemble the plurality of unique document files into a plurality of document packages where each document package has a unique identifier; determine that a required document is missing from at least one document package of the plurality of document packages; send a notification to a smartphone specifying the required document, where the smartphone corresponds to the at least one document package's unique identifier; receive a document file from the smartphone in response to the notification, where the image file corresponds to the required document; include the document file in the at least one document package; and send the document package to a second server and delete the document package from the first server. The system further includes a plurality of smartphones, where each smartphone includes a processor, a radio, a camera, a user interface and a display. The smartphone processor is operative to: receive a notification from the server and initiate the camera in response to user input acknowledging the notification.

The disclosed embodiments also provide a non-transitory, non-volatile computer readable memory that contains executable instructions for execution by at least one processor, that when executed cause said at least one processor to perform the various methods of operation and provide the various graphical user interfaces disclosed herein.

Turning now to the drawings, FIG. 1 is a block diagram of a system 100 in which a cloud server 101 is operative to communicate with various computing devices 120, including smartphones 130 to provide, among other things, an application graphical user interface (GUI) useful for obtaining documents 150 and other information from a plurality of smartphones 140. The term "cloud server" as used herein, refers to a server, accessible by an Internet connection, that is operative to host one or more applications that may be accessed by a computing device using a Web browser or an application resident on the computing device.

The term "computing device" as used herein may refer to, for example, a desktop computer, a laptop computer, a tablet computer or a smartphone. The term "smartphone" as used herein refers to a wireless mobile telephone that includes a built-in camera and location hardware such as a Global Positioning System (GPS) chipset. Therefore, the term "smartphone" as used herein refers to a specific type of "computing device."

The cloud server 101 is one type of apparatus of an embodiment and the various smartphones are each another type of apparatus of the embodiments. The cloud server 101 along with the various computing devices 120, smartphones 130 and smartphones 140, are one type of system 100 according to the embodiments. In accordance with the embodiments, the cloud server 101 is accessible via a network, such as the Internet, and is accessible by each of the computing devices 120 and each of the smartphones 130, over an Internet Protocol (IP) connection 121. Each of the computing devices 120 and each of the smartphones 130 that interact with the cloud server 101 are subscribers to a document and data collection tracking service provided by the cloud server 101.

Each smartphone 140 includes, among other things, a camera 145 and a display 147, and is operative to receive an installable mobile application 450 via a content push operation 141 from the cloud server 101, and to install the mobile application 450. Each smartphone, after installing the mobile application 450, is operative to use the mobile application 450 to send document images 149, of various documents 150, to the cloud server 101. The smartphone is also operative to receive various notifications 143 from the cloud server 101. In operation, smartphones 140, via the mobile application 450, are logged in to a document and data collection tracking service application server 111 as client devices and maintain a persistent Internet Protocol (IP) connection with the cloud server 101. The mobile application 450 is operative to, among other things, provide a graphical user interface (GUI) 148 on the smartphone display 147. The terms "image" and "document image" as used herein refer to a digital photograph or scan of a document which may be stored as digital data in a "document file" (i.e. a "digital file," "data file," "electronic file," "image file," etc.). An "image" or "document image" or "document file" as used herein may be displayed on a computing device display, smartphone display, etc. The terms "document image" and "document file" may be used herein interchangeably to refer to the data file which may be stored, or the image which may be displayed. A "document image" or "document file" may be for example, but not limited to, a ".jpg," ".bmp," ".gif," ".tiff," ".pdf," a proprietary file format or any other file format suitable for electronic storage of electronic documents.

The cloud server 101 may further be integrated with, or operatively coupled to, a documents database 119. The cloud server 101 may access and communicate with the documents database 119 using any appropriate database access protocol 117. In some embodiments, the documents database 119 maintains document packages 118 assembled from document images 149 sent by smartphones 140. The document database 119 may be integrated with the cloud server 101 in some embodiments, or may be located physically separate in other embodiments. In most embodiments, document database 119 will be a relational database with the database access protocol 117 using, but not limited to, Structured Query Language (SQL), Open Database Connectivity (ODBC), Java Database Connectivity (JDBC), or some equivalent, etc.

In accordance with the embodiments, the cloud server 101 includes at least one network interface (not shown), at least one processor 103, and a nonvolatile, non-transitory memory 105 that is operatively coupled to the at least one processor 103. The non-volatile, non-transitory memory 105 stores executable instructions (executable code) 115 for a storage engine 107, notification engine 109, and the document and data collection tracking service application server 111. The memory 105 may also store executable instructions for a Web server 112 in some embodiments. The processor 103 is operative to access the memory 105 and to execute the executable instructions 115 stored therein in order to implement the methods of operation of the document and data collection tracking service application server 111, the storage engine 107, notification engine 109 and Web server 112. The executable instructions 115 also includes executable instructions for a document requestor side mobile application which may be provided to smartphones 130 by a push operation, and installed on each of the smartphones 130. The document requestor mobile application provides a GUI 129 on a smartphone display 127 and displays information similar to information provided to the computing devices 120, but formatted for the smartphone display 127. The document and data collection tracking service application server 111 is operatively coupled, via application programming interfaces (APIs), to the storage engine 107, and to the notification engine 109 and Web server 112, and has read and write access to the documents database 119.

The document and data collection tracking service application server 111 is operative to provide a browser accessible GUI 125 for display on each computing device 120 display and each smartphone 130 display 123. The document and data collection tracking service application server 111 is operative to receive user input (i.e. data) entered via the GUI 125 including, but not limited to, information to be sent to one or more of the smartphones 140 as notifications 143. In some embodiments, the document and data collection tracking service application server 111 interfaces with the Web server 112 to provide the browser accessible GUI 125. The document and data collection tracking service application server 111 is also operative to provide a mobile GUI 129 which may also be provided, in some embodiments, by interfacing with the Web server 112 for mobile website access. The document and data collection tracking service application server 111 interfaces with the notification engine 109, to provide notifications to both the document requestor smartphones 130, and the document provider smartphones 140, by providing notifications to the corresponding mobile applications. The document and data collection tracking service application server 111 interfaces with the storage engine 107 to handle storage of document images (i.e. data files) received from the document provider smartphones 140, and to display previews of the document images to the document requestor computing devices 120 and document requestor smartphones 130 via their respective GUIs. The storage engine 107 is operative to communicate, by read and write operations, with the documents database 119 using the database protocol 117.

Figure 2:
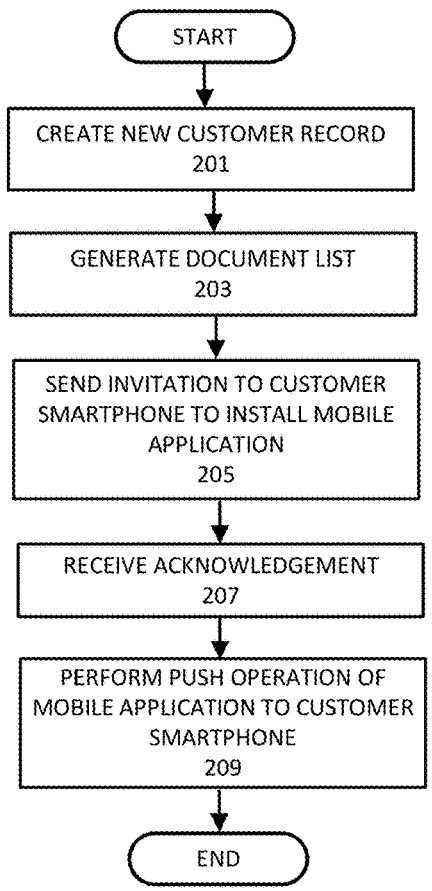
FIG. 2 is a flowchart of a method of operation of a cloud server in accordance with an embodiment.

FIG. 2 is a flowchart of a method of operation of a cloud server, such as cloud server 101 shown in FIG. 1, in accordance with an embodiment. The method of operation begins and in operation block 201, a user of one of the computing devices 120 accesses the document and data collection tracking service application server 111 via a browser and the GUI 125, and creates new document provider record which includes identification information for the document provider's smartphone such as, but not limited to, a mobile telephone number. In operation block 203, the user generates a document list with the GUI 125. In operation block 205, the document and data collection tracking service application server 111 sends an invitation to the document provider's smartphone inviting the document provider to install the mobile application on their smartphone. In operation block 207, the document and data collection tracking service application server 111 receives an acknowledgement that the document provider wishes to install the mobile application, and in operation block 209, the cloud server 101 performs a content push operation 141 to push the mobile application 450 to the smartphone. The method of operation then terminates.

Figure 3:
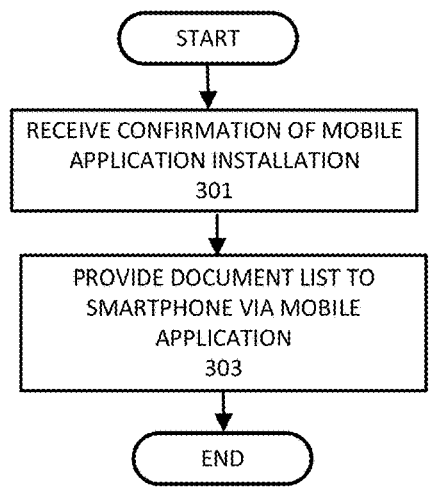
FIG. 3 is a flowchart of a method of operation of a cloud server in accordance with an embodiment.

FIG. 3 is a flowchart of another method of operation of a cloud server 101 in accordance with an embodiment. The method of operation begins, and in operation block 301, the cloud server 101 receives a confirmation from the smartphone that the mobile application 450 has been installed. In operation block 303, the cloud server 101 provides the document list to the smartphone over an Internet connection via the mobile application 450.

Figure 4:
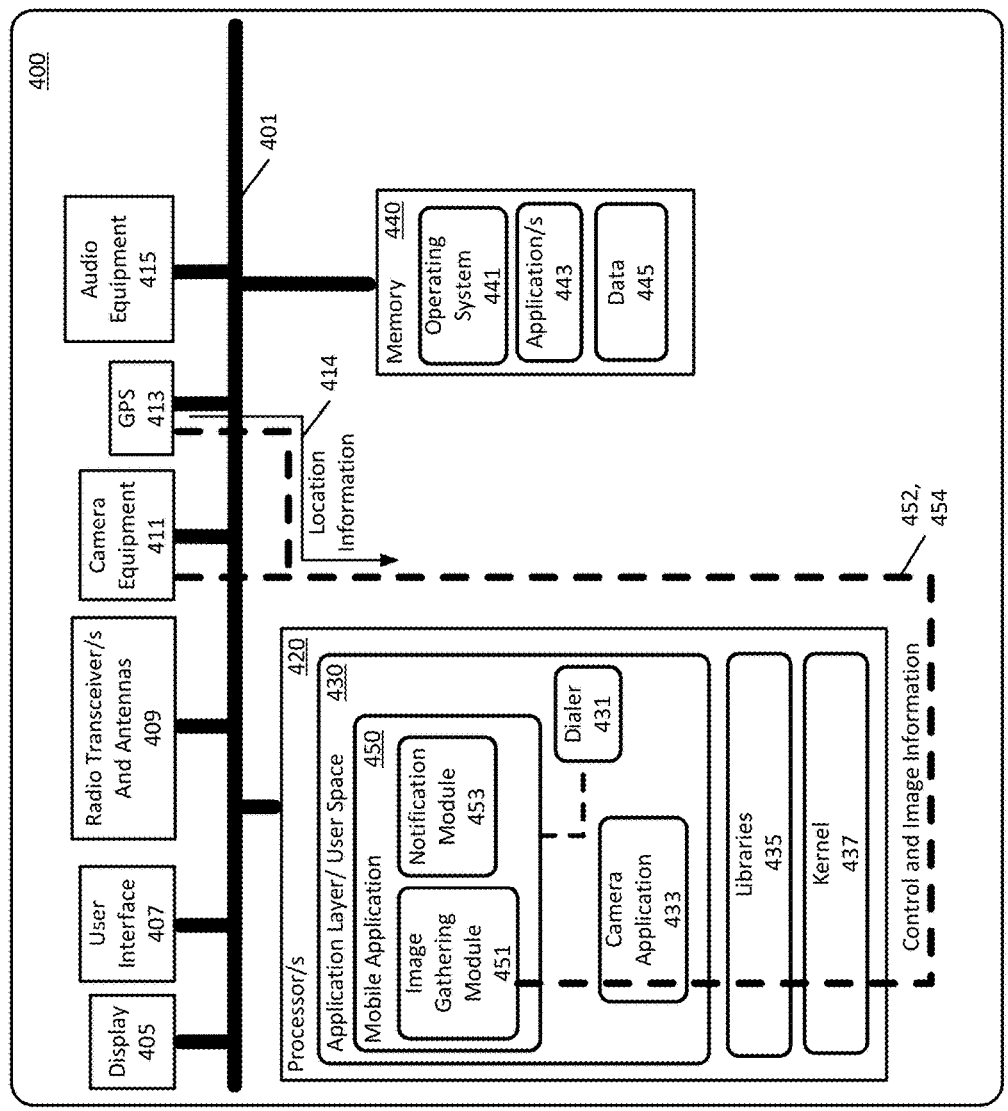
FIG. 4 is block diagram of a smartphone having a mobile application installed in accordance with an embodiment.

FIG. 4 is block diagram of a smartphone 400 that has a mobile application 450 installed in accordance with an embodiment. The smartphone 400 includes an image gathering module 451 and a notification module 453, one or both of which may be implemented as modules of the mobile application 450 in some embodiments. One or both of the image gathering module 451 and the notification module 453 may be implemented as software or firmware (or as a combination of software and firmware) executing on one or more processors, and may also include, or may be implemented independently, using ASICs (application specific integrated circuits), DSPs (digital signal processors), hardwired circuitry (logic circuitry), or combinations thereof. That is, one or both of the image gathering module 451 and a notification module 453 may be implemented using an ASIC, DSP, executable instructions executing on a processor, logic circuitry, or combinations thereof. In the example of FIG. 4, the image gathering module 451 and the notification module 453 are implemented as executable instructions (i.e. as mobile application 450) stored in memory 440 and executed by processor 420.

One or more internal connection buses 401 provide operative coupling between the processor 420 and the other various smartphone 400 components. As used herein, components may be "operatively coupled" when information can be sent between such two components, even though there may be one or more intermediate or intervening components between, or along the connection path. Therefore, any of the various components connected to the internal connection buses 401 may be understood herein to be operatively coupled to the processor 420 or to each other where appropriate. Operative coupling may also exist between modules or components implemented as software or firmware executing on a processor and such "software coupling" may be implemented using libraries 435 (i.e. application programming interfaces (APIs)) or other software interfacing techniques as appropriate. Such libraries or APIs are shown illustrated as providing operative coupling between various software implemented modules or components in FIG. 4. For example, an API enables the mobile application 450 to invoke a dialer 431 application and another API enables the image gathering module 451 to invoke a camera application 433 and interact with camera equipment 411.

The memory 440 is a non-volatile, non-transitory memory, and stores the executable instructions corresponding to various applications 443, including the mobile application 450, and executable instructions corresponding to an operating system 441. The memory 440 may also store data 445 specific to the smartphone user such as, but not limited to, user settings and personal information. The operating system 441 executable instructions, when executed by processor 420, provide an application layer (or "user space" 430) for running the various applications including mobile application 450, libraries 435 and a kernel 437 which provides interfaces to various hardware components of the smartphone 400. The processor 420 is operative to access the memory 440 and execute the stored executable instructions to perform the methods of operation disclosed herein as well as to perform other functions and operations such as running the smartphone 400 operating system, etc.

The smartphone 400 includes various component known and understood by those of ordinary skill in the art such as, but not limited to, audio equipment 415 with at least one microphone and a speaker, and various audio processing components; wireless radio transceiver/s and antennas 409, which may include a wide area network (WAN) transceiver to provides wireless communication capabilities for one or more wide area network communications systems using any of various technologies such as, but not limited to, CDMA, UMTS, GSM, LTE, etc. and also provides Internet connectivity over the wireless interface to communicate with the cloud server 101. Also, as known and understood by those of ordinary skill in the art, a second wireless transceiver may also be present in the smartphone 400 which may provide wireless local area network connections, peer-to-peer connections, etc. and may provide wireless connectivity using technologies such as, but not limited to, WiFi®, Bluetooth®, Wireless USB, ZigBee, or other technologies, etc. The WLAN transceiver, when present, may also provide Internet connectivity. Any present WAN transceivers and/or WLAN transceivers are operatively coupled to one or more antennas.

A user interface (UI) 407 may include a track ball mouse, touch sensitive elements, physical switches, gyroscopic position sensors, etc. The smartphone 400 includes camera equipment 411 as is familiar to most smartphone users. A display 405 may be a liquid crystal display (LCD) and may provide a touchscreen capability that is part of the UI 407 as known and understood by those of ordinary skill. The processor 320 is operative to control the display 305 to provide a graphical user interface (GUI) related to the smartphone operating system, a GUI related to one or more smartphone applications or both.

Global Positioning System (GPS) hardware 413 is operative to provide location data 414 such as, but not limited to, GPS coordinates. The mobile application 450 is operative to communicate with the GPS hardware 413 to obtain location data 414 from time-to-time, if authorized to do so by user preferences that the user may set for the mobile application 450. The mobile application 450 is operative to invoke the dialer 431 application to initiate a phone call. The mobile application 450, via the image gathering module 451, is also operative to send control information 452 to the camera application 433 and/or the camera equipment 411 for the purposes of controlling the camera equipment 411 to capture one or more document images (i.e. to create electronic documents). The image gathering module is operative to, in turn, receive image information 454 from the camera application 433 and/or the camera equipment 411.

In some embodiments, the mobile application 450, including the image gathering module 451, the notification module 453 or both, may operate at the application layer of an IP protocol stack (not shown) executed by the processor 420 to facilitate IP communications with the cloud server 101. An API enables the mobile application 450 to communicate with one or more wireless protocol stacks (and corresponding transceivers) to send image information to the cloud server 101 over a wireless interface using either a WAN transceiver or WLAN transceiver, whichever is available. The image information may be sent to the cloud server 101 in response to capturing document images by the image gathering module 451.

The mobile application 450 is operative to communicate with the various components within the smartphone 400 and with the cloud server 101. For example, the mobile application 450 is operative to interact with the display 405 to provide a GUI 148 and with various communication mode applications such as, but not limited to, a telephone dialer 431 application. The mobile application 450 provide the GUI 148 to, among other things, display notifications received from the cloud server 101 by the notification module 453. The mobile application 450 communicates with the document and data collection tracking service application server 111, to receive notifications related to the status of provided documents, or rejection notifications that explain, for example, why an electronic document was rejected, and/or providing further instructions.

It is to be understood that the mobile application 450 or "modules" such as the image gathering module 451 and/or notification module 453 may be implemented as software or firmware (or a combination of software and firmware) executing on one or more processors, or using ASICs, (application-specific-integrated-circuits), DSPs (digital signal processors), hardwired circuitry (logic circuitry), state machines, FPGAs (field programmable gate arrays) or combinations thereof. Such software or firmware may be referred to herein as executable instructions or executable code and may be stored in non-volatile, non-transitory memory. Therefore the mobile application 450 shown being executed by processor 420 on smartphone 400 illustrated in FIG. 4 is one example embodiment and is not to be construed as a limitation on the various other possible embodiments that may be implemented in accordance with the present disclosure. In embodiments in which the mobile application 450 or one or more modules is implemented as software, or partially in software/firmware, the executable instructions may be stored in the operatively coupled, non-volatile, non-transitory memory 440, or in on-chip or on-die non-volatile, non-transitory memory (not shown), or combinations thereof, and may be accessed by the processor 420, or other processors, as needed.

Therefore, in one example embodiment, one of the image gathering module 451 or notification module 453, or both, may be implemented as a combination of software and firmware) executing on one or more processors. In another example embodiment, one of the image gathering module 451 or notification module 453, or both, may be implemented as an ASIC. In another example embodiment, one of the image gathering module 451 or notification module 453, or both, may be implemented using a DSP. In another example embodiment, one of the image gathering module 451 or notification module 453, or both, may be implemented using an FPGA. Other embodiments having other implementations are contemplated by the present disclosure.

The various embodiments also include non-volatile, non-transitory computer readable memory, other than memory 440, that may contain executable instructions (i.e. executable code), for execution by at least one processor, that when executed, cause the at least one processor to operate in accordance with the functionality and methods of operation herein described. The computer readable memory may be any suitable non-volatile, non-transitory, memory such as, but not limited to, programmable chips such as EEPROMS, flash ROM (thumb drives), compact discs (CDs) digital video disks (DVDs), etc., that may be used to load executable instructions or program code to other processing devices such as servers, smartphones or other devices such as those that may benefit from the features of the herein described embodiments. For example, executable instructions for the mobile application 450 in its entirety, the image gathering module 451 and/or the notification module 351, may be stored on any of the above described forms of non-transitory, non-volatile computer readable memory. In another example, instructions for the document and information collection service application server 111, may be stored on any of the above described forms of non-transitory, non-volatile computer readable memory.

Figure 5:
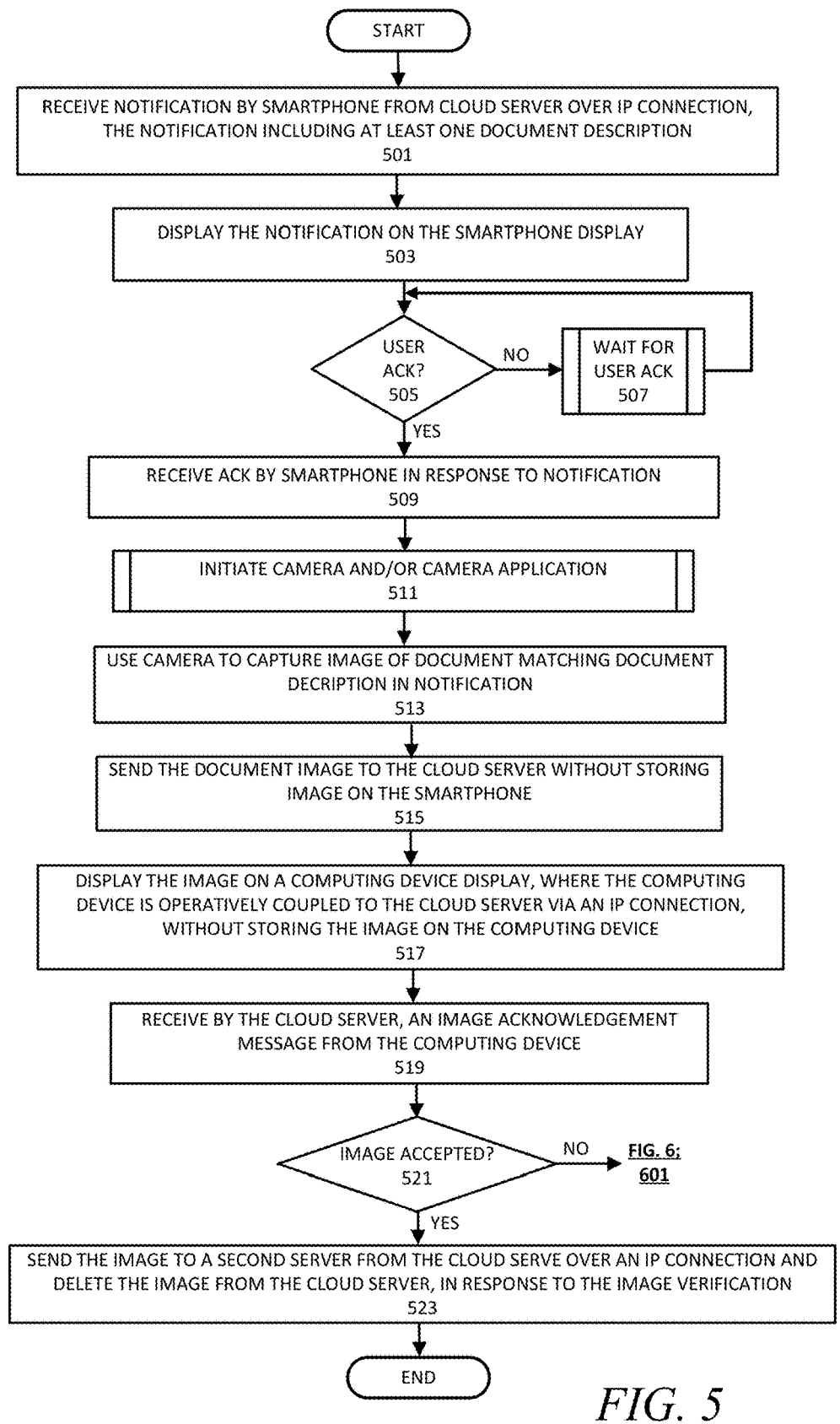
FIG. 5 is a flowchart of a method of operation of the system of FIG. 1, in accordance with an embodiment.

FIG. 5 is a flowchart illustrating one example method of operation of the system of FIG. 1, in accordance with an embodiment. For purposes of describing the method of operation illustrated in FIG. 5, computing device 160 and smartphone 170 shown in FIG. 1 are referenced, however it is to be understood that any of the computing devices 120 and smartphones 140 will communicate with the cloud server 101 in the same manner. Turning to FIG. 5, the method of operation begins, and in operation block 501, smartphone 170 receives a notification 143 from the cloud server 101 over an IP connection. The notification 143 includes at least one document description. A "document description" refers to any human readable, textual, alphanumeric, etc. information that may identify a document type such that a document provider can identify and provide a requested document to a document requestor. In operation block 503, the notification 143 is displayed in displayed in a dialogue box on the smartphone display 147. In decision block 505, the mobile application 450 waits for user acknowledgment. If no user acknowledgement is received at decision block 505, then the mobile application 450 waits for the user acknowledgment as shown in operation block 507.

If a user acknowledgment is sent at decision block 505, then in operation block 509, the mobile application 450 receives the acknowledgment. In operation block 511, the mobile application 450 initiates a camera 145 and/or camera application on the smartphone 170. In operation block 513, the smartphone camera may then be used to capture an image of one of the documents 150 that matches the document description provided in the notification 143. In operation block 515, the document image is sent from the mobile application 450 to the cloud server 101, however the document image is not stored in the smartphone 170 memory. In operation block 517, a preview of the document image 146 may be displayed on the computing device 160 display 123 within the GUI 125. The term "within the GUI" as used herein means that a visual object (such as, but not limited to, a document image, thumbnail image, dialog box, icon, graphic control button, etc.) is displayed while one of the mobile application 450 GUI 148, or the document and information collection service application server 111 GUI 125 is active. A visual object is "within a GUI" when displayed, for example, as a design element of the GUI such as, but not limited to a control button, or as a graphics overlay where it may appear to float above the GUI and can be repositioned by a mouse drag and drop operation. The electronic document is not stored on the computing device 160 during the operation of operation block 517. In operation block 519, the cloud server 101 receives an acknowledgement message from the computing device 160 indicating that the document was viewed. The electronic document may be either accepted or rejected by the user of computing device 160. In operation block 521, the electronic document may be either accepted or rejected. If the electronic document is accepted in decision block 521, this corresponds with the computing device 160 user performing an action such as, but not limited to, selecting a mouse or cursor clickable acceptance button or checking a checkbox within the GUI 125 corresponding to the document image 146 preview. If the electronic document is accepted, then in operation block 523, the cloud server 101 sends the electronic document image to a second server, i.e. one of the document recipient servers 110, and the incoming electronic document image is accepted by a document recipient module 190 which may store the electronic document image accordingly. The method of operation then terminates as shown.

Figure 6:
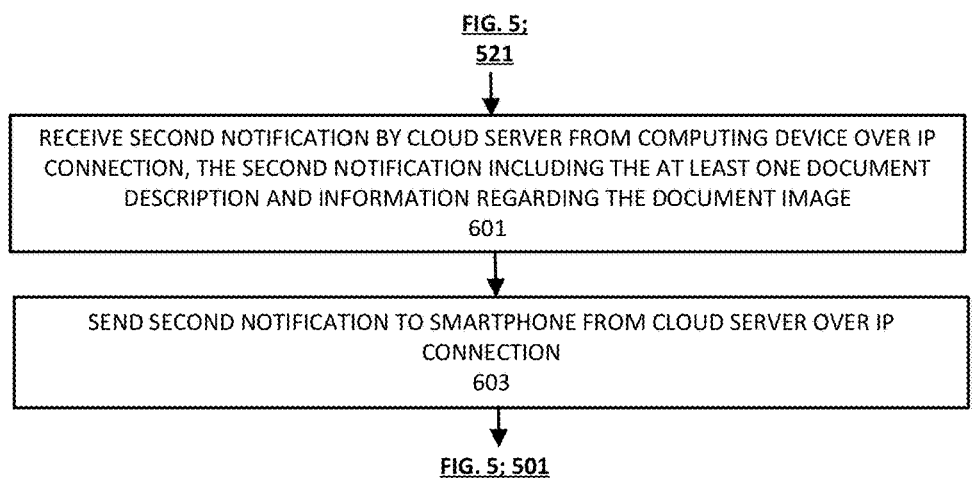
FIG. 6 is a flowchart of a branch of the method of operation of FIG. 5 in accordance with an embodiment.

FIG. 6 is a flowchart of a branch of the method of operation of FIG. 5 in accordance with an embodiment. The method of operation begins as a branch from decision block 521 in FIG. 5, in the case in which the document image is not accepted at the computing device 160. In other words, a document requestor review the document image 146 via the GUI 125 and may reject the electronic document at decision block 521. The document requestor can generate a notification message that provides the reasons for the rejection and possibly further instructions. In operation block 601, the cloud server 101 receives the second notification sent by computing device 160, where the second notification includes at least one document description (such as for the rejected electronic document) and possible further information regarding the electronic document image. In operation block 603, the smartphone 170 receives the second notification from the cloud server 101. The method of operation then goes to operation block 501 in FIG. 5 and repeats the method of operation until all requested documents are accepted at decision block 521.

Figure 7:
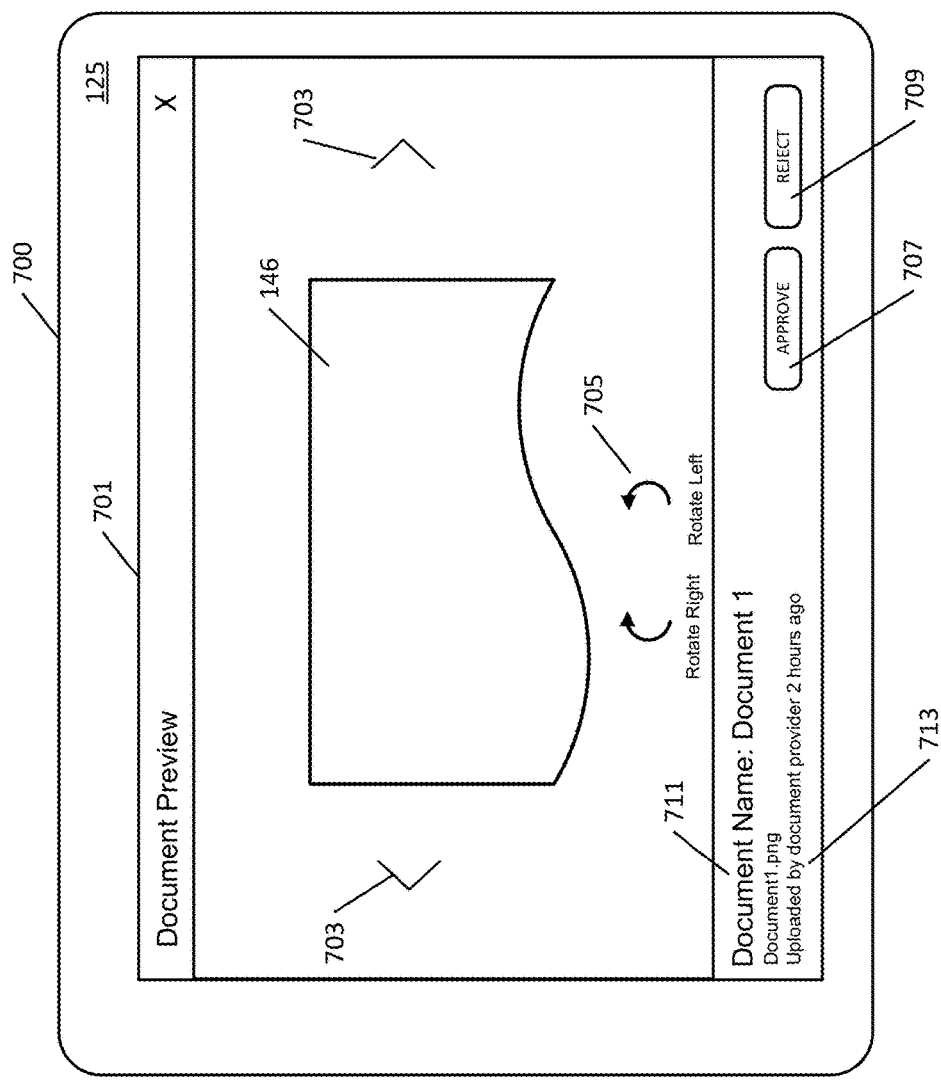
FIG. 7 is an example screen view of GUI, illustrating a document image review screen view displayed on a computing device display in accordance with an embodiment.

FIG. 7 is an example screen view of GUI 125, illustrating a document prereview window 701 displayed on a computing device 120, such as the computing device 160 display, in accordance with an embodiment. The GUI 125 may be displayed in a browser window 700. The document preview window 701 is overlayed over the GUI 125 and therefore other GUI 125 elements behind the document window 701 are "grayed out" and temporarily inactive until the document preview window 701 is closed. In this example, the document image 146 sent from the smartphone 170 is viewable and the computing device 160 user may accept the document by clicking the "APPROVE" control button 707 using the mouse cursor. The computing device 160 user may alternatively reject the document by clicking the "REJECT" control button 709. The document image 146 may be rotated left or right using rotation arrows 705. The document preview window 701 includes a document name field 711 and a document information field 713 which provides information such as, but not limited to, the document filename and the time the document image file was uploaded to the cloud server 101 by the smartphone 170 user. In one embodiment, after the computing device 160 user has either accepted or rejected the document image, the document preview window 701 may automatically scroll to the next document image to be reviewed. In other embodiments, the user selects the right or left navigation arrows 703 to either proceed to the next document image or to return to a previous document image, respectively. It is to be understood that FIG. 7 provides one example of a document review window in accordance with the embodiments and that various other ways of presenting document images for review within the GUI may occur to those of ordinary skill in light of the present disclosure. The various ways of presenting document images for review are contemplated by the present disclosure and the accompanying claims.

Figure 8:
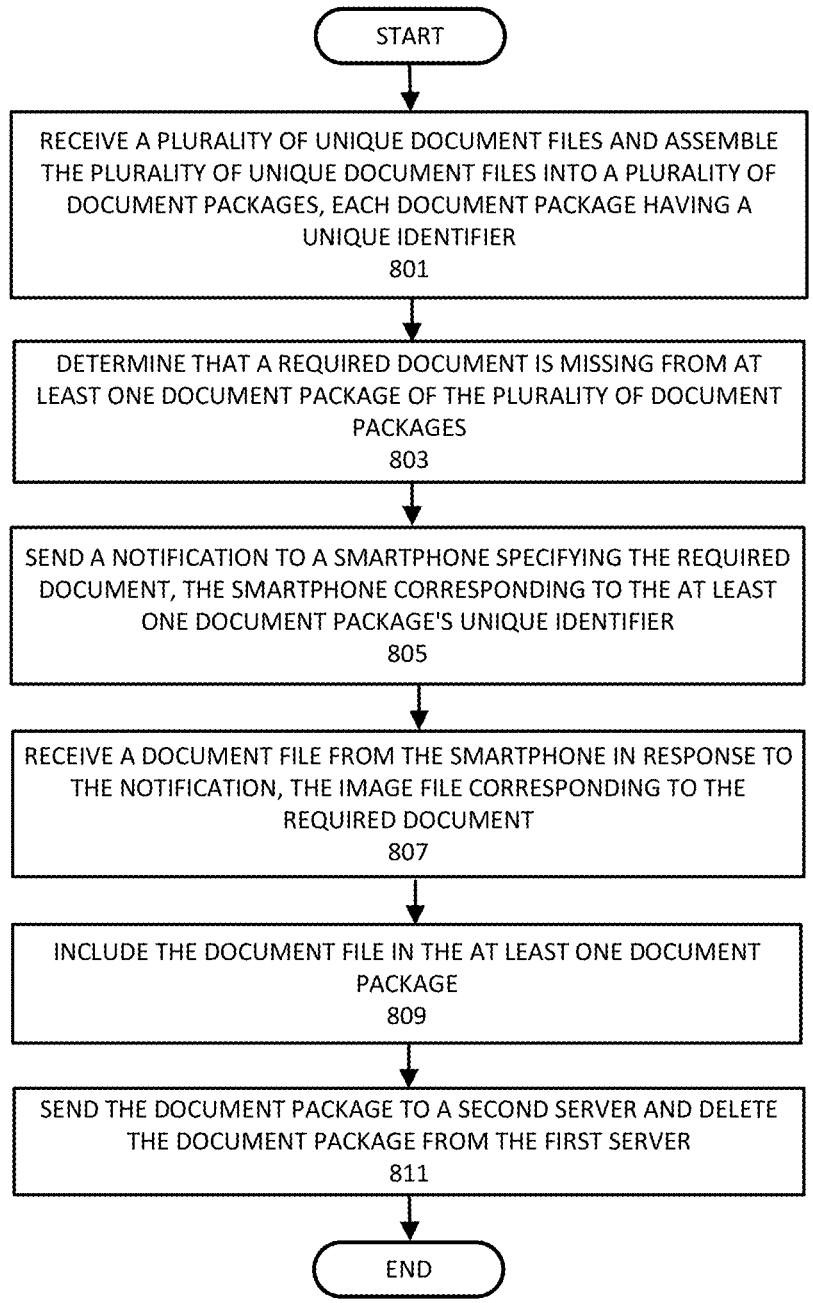
FIG. 8 is a flowchart of another method of operation of the system of FIG. 1, in accordance with an embodiment.

FIG. 8 is a flowchart of another method of operation of the system 100 of FIG. 1, in accordance with an embodiment. The method of operation begins and in operation block 801 a first server, such as the cloud server 101, receives a plurality of unique document files and assemble the plurality of unique document files into a plurality of document packages 118 where each document package 118 has a unique identifier. In operation block 803 the cloud server 101 determines that a required document is missing from at least one document package of the plurality of document packages 118. In operation block 805, the cloud server 101 sends a notification 143 to a smartphone 140 specifying the required document where the specific smartphone that the notification 143 is sent to corresponds to the at least one document package's unique identifier. In operation block 807, the cloud server 101 receives a document image file from the smartphone in response to the notification, where the image file corresponds to the required document. In operation block 809, the cloud server 101 includes the document image file in the at least one document package and, in operation block 811 the cloud server 101 sends the document package to a second server, for example one of the document recipient servers 110, and deletes the document package.

Various applications of the disclosed document management information system may become apparent to those of ordinary skill in light of the above disclosure and such applications are contemplated by the various embodiments disclosed and described in the present disclosure.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method comprising:
receiving a notification by a smartphone from a first server over an Internet Protocol (IP) connection, the smartphone comprising a processor, a radio, a camera, a user interface and a display, the notification comprising a document description;
displaying the notification on the smartphone display;
initiating the camera by the processor, automatically in response to an acknowledgement of the notification;
capturing an image of a document matching the document description using the camera;
sending the image to the first server in response to the notification, without storing the image on the smartphone;
displaying the image on a computing device display without storing the image on the computing device, the computing device operatively coupled to the first server via an IP connection;
receiving an image acknowledgement at the first server, from the computing device; and
sending the image to a second server from the first server over an IP connection.

2. The method of claim 1 further comprising:
automatically deleting the image from the first server, in response to acceptance message accepting the image by the computing device.

3. The method of claim 2, further comprising:
receiving the image acknowledgement at the first server, from the computing device, where the image acknowledgement comprises an acceptance message.

4. The method of claim 1, further comprising:
determining by the first server that a required document is not present on the first server; and
sending the notification to the smartphone comprising the document description for the required document.

5. The method of claim 1, further comprising:
receiving the image at the first server;
displaying the image on a second display operatively coupled to the first server;
receiving a second user input at the first server verifying the image; and
sending the image to a second server over an IP connection and automatically deleting the image from the first server, in response to the user input verifying the image.

6. A system comprising:
a smartphone, comprising:
camera equipment;
a display;
memory; and
a processor operatively coupled to the camera equipment, to the display and to the memory, the processor operative to:
receive a notification from a first server over an Internet Protocol connection, the notification comprising a document description;
display the notification on the display;
initiate the camera equipment, automatically in response to an acknowledgement of the notification;
capture an image of a document matching the document description using the camera;
send the image to the first server in response to the notification, without storing the image in the memory; and
a computing device, comprising:
a computing device display;
computing device memory; and
a computing device processor operatively coupled to the display and to the memory, the computing device processor operative to:
display the image on a computing device display without storing the image in the computing device memory, the computing device operative to be coupled to the server via an IP connection;
send an image acknowledgement to the server; and
the first server comprising:
first server memory; and
a first server processor operatively coupled to the first server memory, the first server processor operative to:
receive the image acknowledgement from the computing device; and
send the image to a second server over an IP connection.

7. The system of claim 6, where the first server processor is further operative to:
automatically delete the image from the first server memory, in response to an acceptance message accepting the image by the computing device.

8. The system of claim 7, where the first server processor is further operative to:
receive the image acknowledgement from the computing device, where the image acknowledgement comprises an acceptance message.

9. The system of claim 6, where the first server processor is further operative to:
determine that a required document is not present in either of the first server memory or a database; and
send the notification to the smartphone comprising the document description for the required document.

10. The system of claim 6, where the first server processor is further operative to:
receive the image;
display the image on a second display operatively coupled to the first server;
receive a second image acknowledgement; and
send the image to a second server over an IP connection and automatically delete the image from the first server memory, in response to the image acknowledgement.

11. A system comprising:
a first server, comprising a first server processor and memory operatively coupled to the first server processor, the first server processor operative to:
receive a plurality of unique document files and assemble the plurality of unique document files into a plurality of document packages, each document package having a unique identifier;

determine that a required document is missing from at least one document package of the plurality of document packages;

send a notification to a smartphone specifying the required document, the smartphone corresponding to the at least one document package's unique identifier;

receive a document file from the smartphone in response to the notification, the image file corresponding to the required document;

including the document file in the at least one document package; and sending the document package to a recipient server and deleting the document package from the first server; and a plurality of smartphones, each smartphone comprising a smartphone processor, a radio, a camera, a user interface and a display, the smartphone processor operative to:

receive a notification from the first server and initiate the camera in response to user input acknowledging the notification.

12. The system of claim 11, wherein the first server processor is further operative to:

provide a browser accessible GUI to a plurality of remote computing devices.

13. The system of claim 12, wherein the first server processor is further operative to provide a browser accessible GUI to a plurality of remote computing devices, the browser accessible GUI comprising:

a document preview window operative to display each unique document file as a document image.

14. The system of claim 13, wherein the document preview window comprises:

navigation arrows that, when activated, scroll the document images shown in the document preview window.

15. The system of claim 13, wherein the document preview window comprises selectable buttons within the preview window for approving or rejecting the displayed document image.

16. The system of claim 13, wherein the document preview window comprises selectable rotation icons within the preview window for rotating the displayed document image clockwise or counterclockwise.

17. The system of claim 13, wherein the document preview window comprises:

a document name field identifying the document image displayed in the document preview window.

18. The system of claim 17, wherein the document preview window further comprises:

a document information field indicating a time when the document file, corresponding to the document image displayed in the document preview window, was uploaded to the first server.

19. The system of claim 15, wherein the first server processor is further operative to:

send a notification message to a smartphone in response to selection input received via one of the selectable buttons for approving or rejecting the displayed document image.

20. A non-transitory, non-volatile computer readable memory comprising:

executable instructions for execution by at least one processor, that when executed cause said at least one processor to:

receive a plurality of unique document files and assemble the plurality of unique document files into a plurality of document packages, each document package having a unique identifier;

determine that a required document is missing from at least one document package of the plurality of document packages;

send a notification to a smartphone specifying the required document, the smartphone corresponding to the at least one document package's unique identifier;

receive a document file from the smartphone in response to the notification, the image file corresponding to the required document;

including the document file in the at least one document package; and sending the document package to a second server and deleting the document package from the first server.

* * * * *